United States Patent
Shimizu et al.

[11] Patent Number: 5,823,094
[45] Date of Patent: Oct. 20, 1998

[54] RESINOUS CYLINDER

[75] Inventors: Motoyuki Shimizu, Okazaki; Minoru Hayashi, Nagoya; Kiyotaka Nakai, Chita, all of Japan

[73] Assignee: Aisin Seiki Kabushiki Kaisha, Kariya, Japan

[21] Appl. No.: 672,967

[22] Filed: Jul. 1, 1996

[30] Foreign Application Priority Data

Jun. 3, 1995 [JP] Japan .................................. 7-165425

[51] Int. Cl.⁶ .................................................. F01B 11/02
[52] U.S. Cl. ............................................ 92/170.1; 60/585
[58] Field of Search ................................ 92/170.1, 169.1; 60/533, 585

[56] References Cited

U.S. PATENT DOCUMENTS

| | | | |
|---|---|---|---|
| 4,723,902 | 2/1988 | Erickson | 425/380 |
| 4,793,139 | 12/1988 | Reynolds | 60/562 |
| 4,941,323 | 7/1990 | Leigh-Mowstevens | 92/170.1 |
| 5,253,577 | 10/1993 | Schowlau et al. | 92/170.1 |

FOREIGN PATENT DOCUMENTS

| | | |
|---|---|---|
| 59-143627 | 8/1984 | Japan . |
| 60-37459 | 2/1985 | Japan . |
| 3-73728 | 7/1991 | Japan . |

*Primary Examiner*—Thomas E. Denion
*Attorney, Agent, or Firm*—Oblon, Spivak, McClelland, Maier & Neustadt, P.C.

[57] ABSTRACT

A resinous cylinder comprises a cylindrical portion with an open end and a closed end, and is formed by flowing raw material of resin from the center of the closed end. A first attaching portion is disposed at the side of the open end of the cylindrical portion and has a hole for securing to a vehicle body. A flange portion has a second attaching portion disposed at the side of the closed end. The second attaching portion has a hole for securing the resinous cylinder to the vehicle body. A resin flowing portion is formed between the second attaching portion and the closed end of the cylindrical portion. A connecting portion connects the first attaching portion and the second attaching portion through a clearance with the cylindrical portion. A volume of the flange portion is reduced so that a resin flowing speed of the flange portion is faster than a resin flowing speed of the cylindrical portion. The first attaching portion, the flange portion and the connecting portion are integrally formed with the cylindrical portion.

4 Claims, 3 Drawing Sheets

RESINOUS CYLINDER

BACKGROUND OF THE INVENTION

1. Field of the Invention

The present invention relates to a resinous cylinder used for a brake master cylinder or a clutch release cylinder for an automobile.

2. Discussion of the Art

An oil pressure cylinder, for example, a brake master cylinder or a clutch release cylinder, is generally formed by metal. On the other hand, it has been considered to use a resinous cylinder in order to reduce a weight and price of the cylinder. An example of a related resinous cylinder which has a cylindrical portion and a flange portion having two attaching holes for fixing to a vehicle body is shown in FIG. 4. As shown in FIG. 4, a resinous cylinder is formed by a mold 30 and slide cores 31,32. The cylindrical portion 34 is integrally formed with the flange portion 35 by flowing a resin from a gate 33.

However, in the conventional resinous cylinder shown in FIG. 4, the mold 30 has a large space between the gate side of the cylindrical portion 34 and the flange portion 35. This large space decides a flowing speed and a quantity of the resin. When forming the resinous cylinder, a weld line is surely generated at the portion where a flowing resin which forms the cylindrical portion 34 and a flowing resin which forms the flange portion 35 meets. As shown in FIG. 4, the volume of the flange portion 35 is large, and the speed of the flowing resin in the flange portion 35 is slow. It is likely that the weld line is generated nearly parallel with an axial direction of the cylindrical portion 34. Because a resisting pressure at the weld line is smaller than that of the other part, the resisting pressure of the resinous cylinder becomes low, when the inner pressure of the cylindrical portion 34 becomes large.

SUMMARY OF THE INVENTION

It is, therefore, an object of the present invention to provide for a resinous cylinder which overcomes the above drawbacks.

A further object of the present invention is to increase a resisting pressure of the resinous cylinder taking into account the weld line.

In order to achieve these objects, there is provided a resinous cylinder comprising, a cylindrical portion, which has an open end and a closed end, and is formed by flowing raw material of resin from the center of the closed end. A first attaching portion is disposed at the side of the open end and has a first hole for securing to a vehicle body. A flange portion has a second attaching portion disposed at the side of the closed end. The second attaching portion has a second hole for securing the resinous cylinder 10 to the vehicle body. A resin flowing portion is formed between the second attaching portion and the closed end of the cylindrical portion. A connecting portion connects the first attaching portion and the second attaching portion through a clearance with the cylindrical portion. A volume of the flange portion is reduced so that a resin flowing speed of the flange portion is faster than a resin flowing speed of the cylindrical portion. The first attaching portion, the flange portion and the connecting portion are integrally formed with the cylindrical portion.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
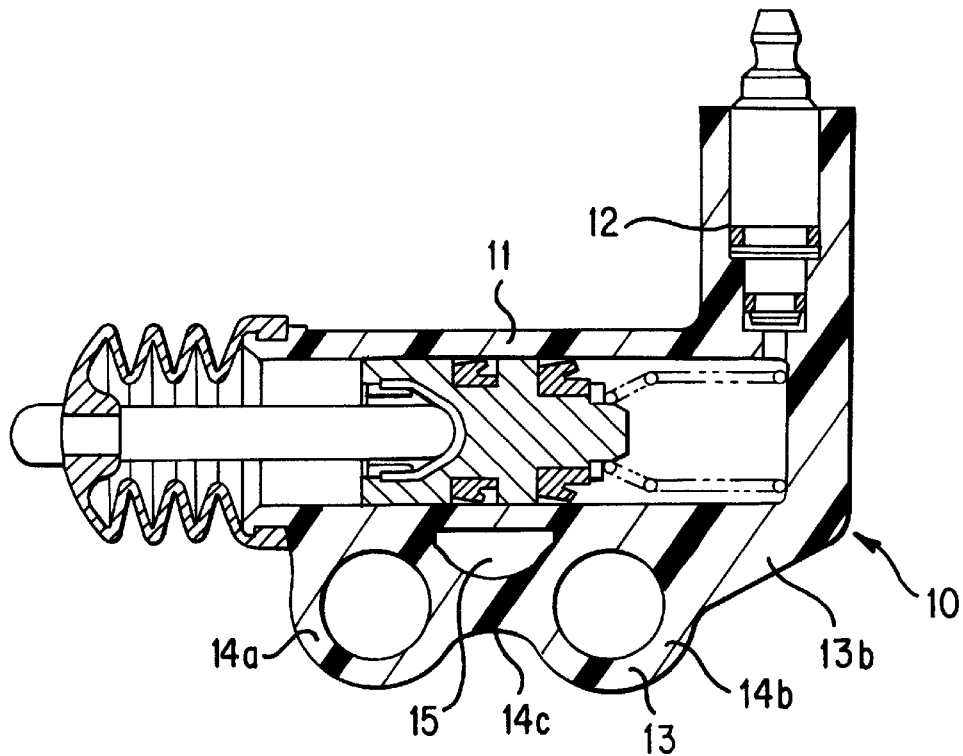
FIG. 1 is an explanatory drawing of a resinous cylinder according to an embodiment of the present invention.

Referring now to the drawings, wherein like reference numerals designate identical or corresponding parts throughout the several views, hereinafter a resinous cylinder according to an embodiment of the present invention is explained with reference to FIG. 1 and FIGS. 3a, 3b.

Figure 2:
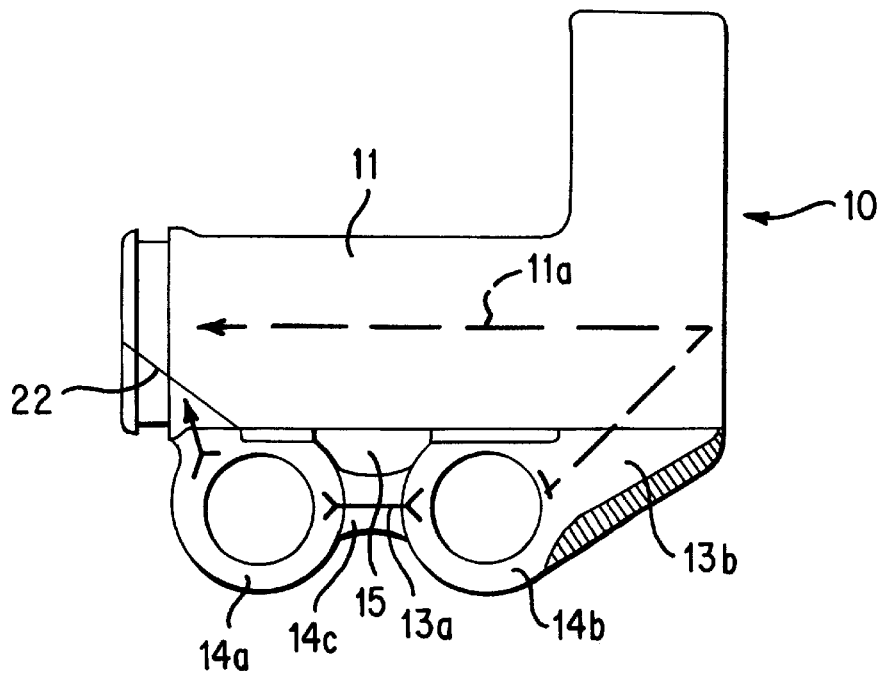
FIG. 2 is an explanatory drawing of a flowing of the resin in forming a resinous cylinder.

FIG. 1 is a cross section of the resinous cylinder of an embodiment of the present invention, and FIG. 2 is an explanatory drawing of a flowing of the resin in forming a resinous cylinder. In this embodiment, a clutch release cylinder is used as an example of the resinous cylinder.

A resinous cylinder 10 comprises a cylindrical portion 11, a first attaching portion 14a, a flange portion 13 and a connecting portion 14c. The cylindrical portion 11 has an open end and a closed end, and is formed by flowing raw material of resin from the center of the closed end. The first attaching portion 14a is disposed at the side of the open end and has a hole for securing to a vehicle body. The flange portion 13 has a second attaching portion 14b disposed at the side of the closed end. The second attaching portion 14b has a hole for securing the resinous cylinder 10 to the vehicle body. A resin flowing portion is formed between the second attaching portion 14b and the closed end of the cylindrical portion 11. The connecting portion 14c connects the first attaching portion 14 and the second attaching portion 14b through a clearance with the cylindrical portion. A volume of the flange portion 13 is reduced so that a resin flowing speed of the flange portion 13 is faster than a resin flowing speed of the cylindrical portion 11. The first attaching portion 14a, the flange portion 13 and the connecting portion 14c are integrally formed with the cylindrical portion 11.

The holes of the first attaching portion 14a and the second attaching portion 14b are formed parallel with an axial direction of the cylindrical portion 11. The resin flowing portion 13b which is formed between the second attaching portion 14b and the closed end of the cylindrical portion 11 is cut as shown in the hatched portion of FIG. 2. The hatched portion of FIG. 2 was included in the related resinous cylinder. The side of the closed end of the cylindrical portion 11 has a port 12 which is perpendicular to the axial direction of the cylindrical portion 11. An outer edge of the resin flowing portion can be positioned nearer to a side of the cylindrical portion than a line which is extended from the outer circumferential portion in a tangential direction of the second attaching portion to an outer edge of the closed end of the cylindrical portion.

Since the quantity of swelling and contraction is different in the case of the thickness of the resin being different, the quantity of swelling and contraction of resin which unitedly forms the cylindrical portion 11 and the flange portion 13 is larger than that of the resin which forms the cylindrical portion 11 only. Therefore, it is likely possible that the inner surface of the cylindrical portion 11 does not become a precise circle. A clearance 15 is formed for reducing a contacting portion between the cylindrical portion 11 and the flange portion 13, therefore, the inner surface of the cylindrical portion 11 becomes a precise circle. The first flowing route 11a flowing in the cylindrical portion 11 and the second flowing route 13a flowing in the flange portion 13 are separated by the clearance 15.

Figure 3A:
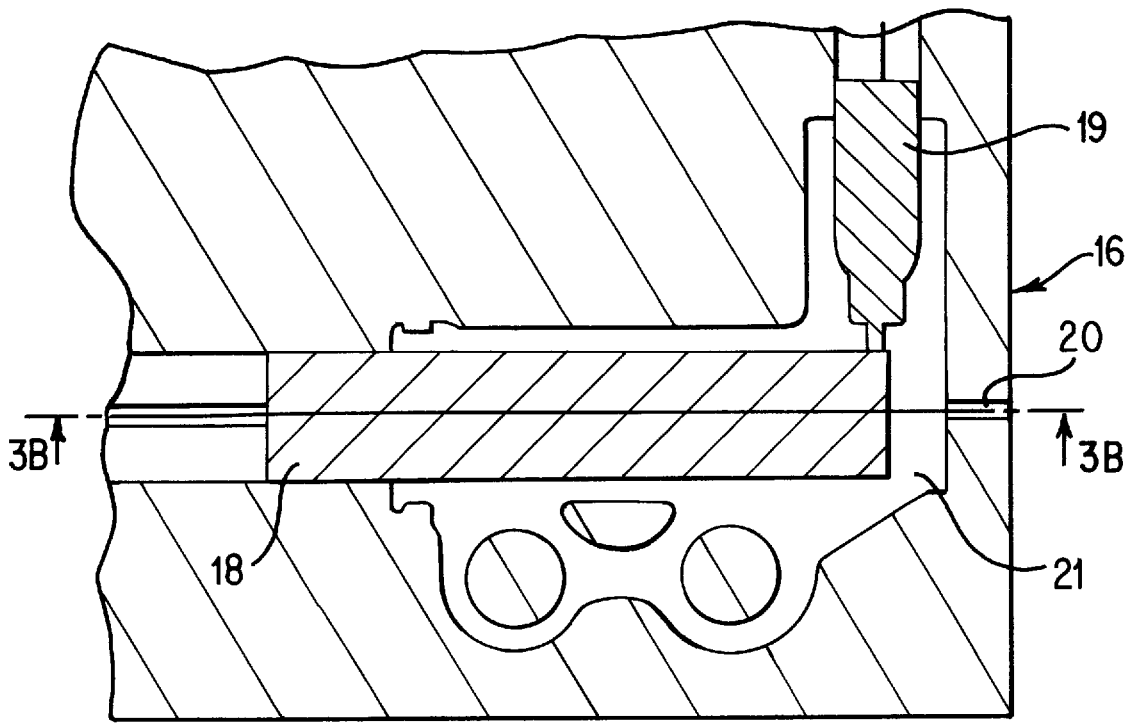
FIGS. 3a and 3b are explanatory drawings of a mold of the resinous cylinder according to an embodiment of the present invention.
Figure 3B:
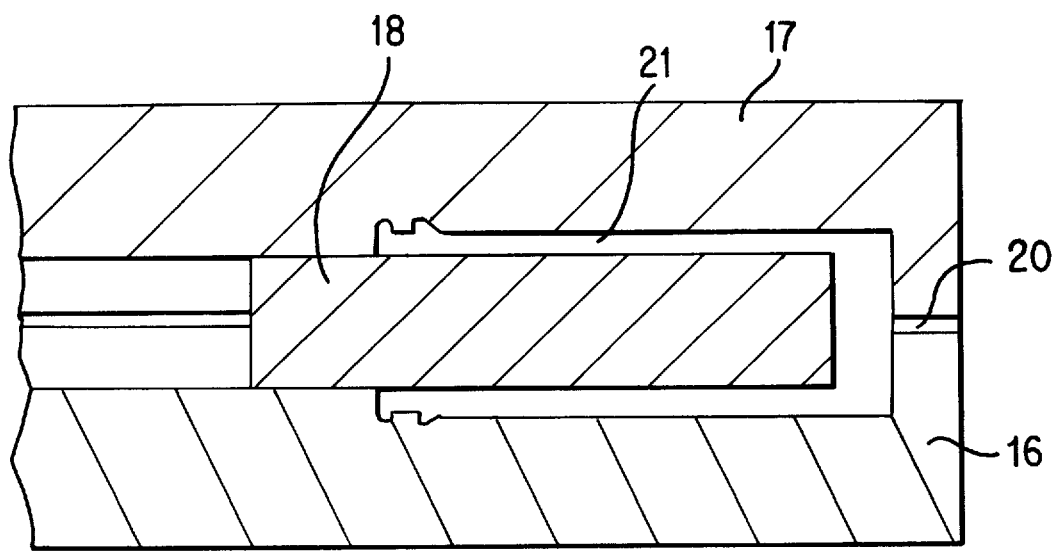
Figure 4:
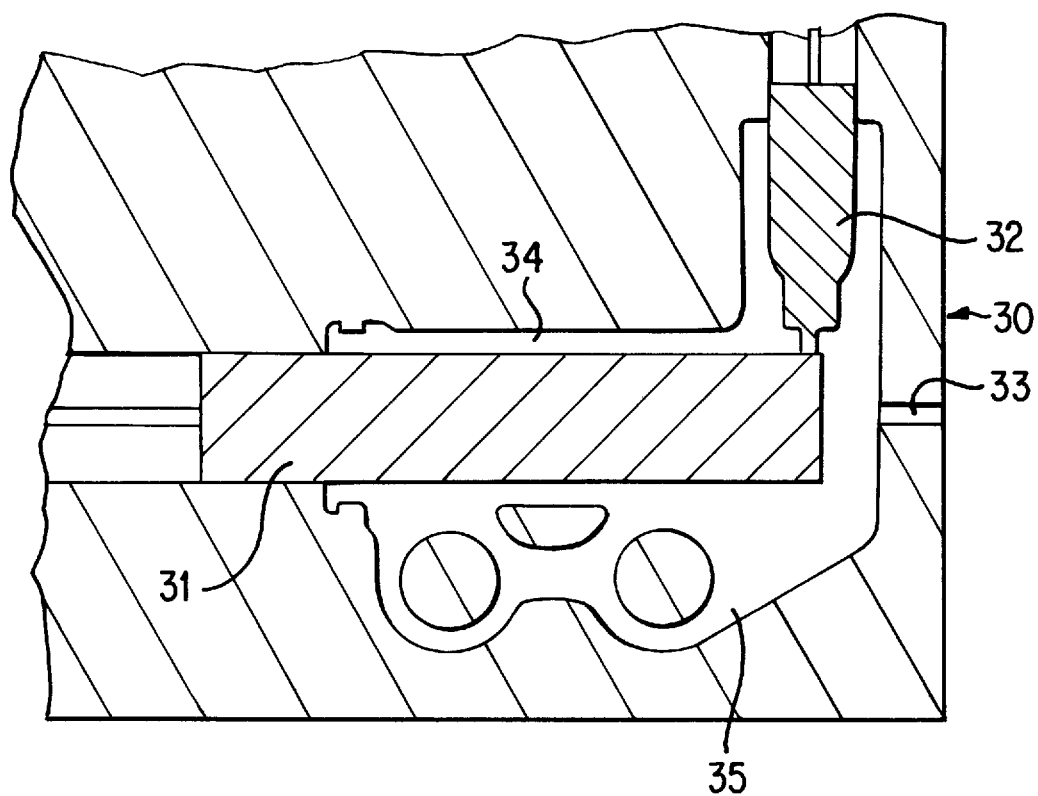
FIG. 4 is an explanatory drawing of a mold of a related resinous cylinder.

FIG. 3a and FIG. 3b are explanatory drawings of a mold of the resinous cylinder according to the present invention. FIG. 3b is an A—A cross section of FIG. 3a. The mold comprises a fixed mold 16, a movable mold 17, a first slide core 18 which forms an oil-pressure space of the cylindrical portion 11, and a second slide core 19 which forms the port 12. The first slide core 18 and the second slide core 19 are disposed in a predetermined position in FIGS. 3a, 3b by a slide pin. The cores 18,19 are slidable corresponding to the opening and closing of the movable mold 17. A gate 20 is formed between the fixed mold 16 and the movable mold 17, when the fixed mold 16 and the movable mold 17 are faced.

Next, a manufacturing method of the resinous cylinder will be explained. At the beginning, a cavity 21 which forms the resinous cylinder 10 in the mold is formed by setting the first slide core 18 and the second slide core 19 in a fixed position. Then a raw material of resin is flowed from the gate 20 to the cavity 21. The gate 20 is located on a center of the cylindrical portion 11 for the cylindrical portion 11 being a precise circle. In this embodiment, a raw material of resin is an aromatic nylon comprising a glass fiber. Because the clearance 15 is formed between the flange portion 13 and the cylindrical portion 11, resin flows into the cavity 21 through the first flowing route 11a and the second flowing route 13a. When the volume of the resin flowing portion 13b is made as small as possible, a flowing speed of resin becomes speedy and the weld line which forms at the joining portion of the first flowing route 11a and the second flowing route 13a is at an angle with the axial direction of the cylindrical portion 11.

The resisting pressure of the resinous cylinder 10 is the smallest when the weld line 22 is parallel with the axial direction of the cylindrical portion 11, because the inner surface of the cylindrical portion 11 is pressed in a radius direction uniformly by the oil-pressure. In this invention, an angle of the weld line 22 can be changed by changing the flowing speed of resin. The flowing speed of resin can be changed by changing the volume of the flange portion 13, since changing the volume of the cylindrical portion 11 is impossible.

The flowing speed of resin which flows in the flange portion 13 becomes speedy by reducing the volume of the flange portion 13, and the weld line 22 is at an angle with the axial direction of the cylindrical portion 11 as shown in FIG. 2. A relation between the angle of the weld line 22 and the resisting pressure of the resinous cylinder 10 is shown in the following Table 1.

TABLE 1

| angle of weld line | strength of resisting pressure |
| --- | --- |
| 20° | 140 kgf/cm$^3$ |
| 30° | 150 kgf/cm$^3$ |
| 45° | 200 kgf/cm$^3$ |

Judging from Table 1, as an angle of the weld line 22 becomes bigger, the resisting pressure of the resinous cylinder 10 becomes bigger.

The volume of the flange portion 13 is reduced so that a resin flowing speed of the flange portion 13 is faster than a resin flowing speed of the cylindrical portion 11. A position of the weld line 22 will be at an angle with the axial direction of the cylindrical portion 11. It is therefore possible to form a proper angle of the weld line 22 by changing a volume of the flange portion 13b, in order to strengthen the resisting pressure.

Obviously numerous modifications and variations of the present invention are possible in light of the above teaching. It is therefore to be understood that within the scope of the appended claims, the invention may be practiced otherwise than as specifically described herein.

What is claimed as new and is desired to be secured by Letters Patent of the United States is:

1. A resinous cylinder comprising:

a cylindrical portion having an open end and a closed end, the cylindrical portion being formed by flowing raw material of resin from a center of the closed end of the cylindrical portion;

a flange portion integrally formed with the cylindrical portion and having a first attaching portion, a second attaching portion and a connecting portion;

the first attaching portion located at a side of the open end and having a first hole for securing to a vehicle;

the second attaching portion located at a side of the closed end and having a second hole for securing to the vehicle; and the connecting portion connecting the first attaching portion and the second attaching portion and having a clearance with the cylindrical portion;

wherein the resin flowing in the cylindrical portion flows through a first flowing route and the resin flowing in the flange portion flows through a second flowing route, and wherein the volume ratio of the flange portion to the cylinder portion is determined so that a weld line which is formed at a joining portion between the first and second flowing routes is formed on the cylinder portion at the side of the open end while maintaining a predetermined angle of the weld line with respect to an axial direction of the cylindrical portion.

2. The cylinder of claim 1 wherein said predetermined angle is at least 20°.

3. The cylinder of claim 1 wherein said predetermined angle is at least 30°.

4. The cylinder of claim 1 wherein said predetermined angle is at least 45°.

* * * * *

UNITED STATES PATENT AND TRADEMARK OFFICE
CERTIFICATE OF CORRECTION

PATENT NO. : 5,823,094
DATED : October 20, 1998
INVENTOR(S) : Motoyuki SHIMIZU et al.

It is certified that error appears in the above-identified patent and that said Letters Patent is hereby corrected as shown below:

On the Title page, Item [30], Foreign Application Priority Data information is incorrect. It should be:

--Jun. 30, 1995   [JP]   Japan............7-165425--

Signed and Sealed this

Eighteenth Day of May, 1999

Attest:

Attesting Officer

Q. TODD DICKINSON

Acting Commissioner of Patents and Trademarks